United States Patent Office

3,845,157
Patented Oct. 29, 1974

3,845,157
HYDROCARBON LUBRICANTS FROM OLEFIN POLYMERS
Charles Woo, Sarnia, Ontario, Canada, assignor to Esso Research and Engineering Company, Linden, N.J.
No Drawing. Filed Sept. 29, 1972, Ser. No. 293,487
Int. Cl. C07c 3/20, 5/02
U.S. Cl. 260—683.9      7 Claims

ABSTRACT OF THE DISCLOSURE

A lubricating oil having a high viscosity index and a low pour point is produced by the thermal cracking of a rubbery olefin polymer, particularly a copolymer of ethylene and a $C_3$ to $C_{10}$ alpha olefin such as propylene, in the presence of a silica-alumina cracking catalyst. Desirably, the cracked product is subsequently hydrogenated to remove unsaturation.

BACKGROUND OF THE INVENTION

It is known to produce lubricating oils of high viscosity index by the polymerization of olefins and it is also known to produce such lubricating oils by thermally cracking olefin polymers or copolymers. See for example David S. Gates et al., Industrial Engineering Chemistry, Product Research and Development, Volume 8, No. 3, September 1969, page 299. See also U.S. Pat. 3,676,521.

DESCRIPTION OF THE INVENTION

In accordance with the present invention, is has been found that the process for preparing high viscosity index lubricating oils by the thermal cracking of olefin polymers, particularly of ethylene copolymers, can be improved if the cracking operation is conducted in the presence of a silica-alumina cracking catalyst. With a given starting material the oil obtained when using such catalyst has a higher viscosity index and a lower pour point than when no catalyst is used in the cracking operation.

The starting materials for the process of this invention are high molecular weight olefin copolymers having viscosity average molecular weights within the range of about 5,000 and 900,000. More usually the viscosity average molecular weights will be within the range of about 100,000 and 500,000. Particularly useful are rubbery copolymers of ethylene and one or more alpha-olefins having from about 3 to 10 carbons atoms, including propylene, 1-butene, isobutene, 4-methyl - 1 - pentene, 1-pentene, 1-hexene, 1-octene, 5,5-dimethyl - 1 - octene, etc. Most especially useful are copolymers of ethylene and propylene or of ethylene and normal or isobutylene. Such copolymers are produced by well known methods and the polymerization reaction per se does not constitute a part of the present invention. Usually the copolymers are prepared in the presence of a Ziegler catalyst. For example, ethylene can be reacted with an alpha-olefin such as propylene, 1-pentene, etc. in the presence of a catalyst prepared by activating $VCl_4$ or $VOCl_3$ with an alkyl aluminum halide. The reaction conditions are well documented in the prior art. See, for example, U.S. Pats. 3,300,459; 3,328,366; 3,370,052.

Another class of particularly useful rubbery copolymers comprises terpolymers of ethylene, propylene and a nonconjugated diolefin of from about 6 to about 18 carbon atoms such as 1,4-hexadiene, ethylidene norbornene, methylene norbornene, dicyclopentadiene, etc.

Thus the copolymers used as starting materials for the production of lubricating oils in accordance with this invention will contain from about 20 to 95 mole percent, preferably about 40 to 85 mole percent, of ethylene, from about 5 to 80 mole percent, preferably about 15 to 60 mole percent of a $C_3$ to $C_{10}$ alpha-olefin, and from zero to about 10 mole percent of a conjugated diolefin.

Specific examples of starting copolymers include: a copolymer of 50 mole percent ethylene and 50 mole percent propylene of about 225,000 viscosity average molecular weight; a terpolymer of 70 mole percent ethylene, 25 mole percent propylene and 5 mole percent 1,4-hexadiene of about 110,000 viscosity average molecular weight; a copolymer of 60 mole percent of ethylene and 40 mole percent of isobutylene of about 330,000 viscosity average molecular weight; and a copolymer of 50 mole percent ethylene, 40 mole percent propylene and 10 mole percent 1-pentene of about 385,000 viscosity average molecular weight.

The catalytic cracking operation to which the rubbery olefin polymer is subjected can be conducted at a temperature in the range of about 600° to 1100° F. and can be run batchwise or continuously. Batchwise operations will normally be run at atmospheric pressure or ambient pressures or at a pressure that is generated by the reaction although they can also be run at reduced pressure. Continuous cracking operations are preferably run at atmospheric pressure or less, preferably fom about 0.01 to about 100 mm./Hg absolute. Conventional fluidized bed catalytic cracking can be employed. Catalyst-to-feed ratios can vary from about 1% to 30% on a batch basis, more usually about 5% to 15%, while the feed rates in continuous processes can vary from about 0.1 to about 10 volumes of feed per volume of catalyst per hour, depending somewhat on the cracking temperature. Cracking is conducted in such manner as to yield oils having viscosities in the range of about 30 to 70 SUS measured at 210° F.

The cracking catalyst can be any of the conventional silica-alumina catalysts which normally contain a major proportion of silica and a minor proportion of alumina, with or without additional metals such as sodium, calcium, etc. Representative catalysts will usually contain about 13 to 25% alumina, although catalysts with higher alumina contents can also be used. See, for example, U.S. Pats. 2,798,857 and 2,844,523. A silica-alumina-magnesia catalyst can also be employed. See U.S. Pat. 3,157,591. Particularly preferred are the aluminosilicate molecular sieve catalysts as described for example in British Pat. 1,000,-901 or U.S. Pat. 2,971,903. Encapsulated zeolites and mixtures thereof with conventional silica-alumina catalysts can also be used. See U.S. Pat. 3,558,476.

The product of the catalytic cracking operation is preferably hydrogenated to remove unsaturation. This is conventional hydrofinishing which is usually done in the presence of conventional catalysts such as nickel, nickel molybdate, etc.

The following example, which preferred embodiments, serves to illustrate this invention.

An ethylene-propylene rubber of about 350,000 viscosity average molecular weight containing 46 mole percent of ethylene, and a second ethylene-propylene rubber of about 200,000 viscosity average molecular weight containing 85 mole percent of ethylene, were each subjected to thermal cracking in the presence and in the absence of a silica-alumina molecular sieve cracking catalyst. The catalyst consisted of 5 wt. percent of a 13 angstrom crystalline aluminosilicate zeolite supported on or encapsulated in 95 wt. percent of a silica-alumina matrix having 13 wt. percent alumina. See U.S. Pat. 3,558,476. The zeolite had been modified by incorporation of rare earth metal oxides. The composite catalyst contained 85.2% $SiO_2$, 13.4% $Al_2O_3$, 1.1% rare earth oxides, and 0.2% $Na_2O$. The cracking conditions were 800° F. temperature and 10 mm./Hg absolute pressure. The cracking was conducted as a batchwise operation wherein the cracked product was removed continuously overhead from the cracking chamber at a maximum vapor temperature of 650° F. The cracked product was then subjected to hydrogenation at 500° F. and 800 p.s.i. of hydrogen for one hour in the presence of 5 wt. percent of a nickel catalyst (Harshaw Ni 0104P). The results obtained in the runs both with and without cracking catalyst are presented in Table I which follows.

TABLE I

[Cracking of ethylene-propylene copolymer rubber at 800° F. and 10 mm. Hg]

| Run number | Ethylene in co-polymer, mole percent | Catalyst, wt. percent silica-Alumina-molecular sieve | Yield, 650° F.+, percent | Viscosity SUS at 210° F. | Viscosity Index | Pour, ° F. | Color of oil, Saybolt |
|---|---|---|---|---|---|---|---|
| 1 | 46 | None | 73 | 58 | 120 | +10 | +27 |
| 2 | 46 | 5.0 | 65 | 53 | 134 | −50 | +27 |
| 3 | 85 | None | 80 | | | +100 | |
| 4 | 85 | 5.0 | 65 | 52 | 73 | +35 | +27 |
| 5 | 85 | 20.0 | 50 | 43 | 150 | −10 | +27 |

It will be noted from the data in Table I that when the cracking catalyst was employed, although the yields were reduced, the viscosity index of the oil obtained in each instance was superior to that obtained from the same ethylene-propylene rubber without the use of a cracking catalyst and that moreover the pour points of the oils obtained when using the cracking catalyst were much lower than when no cracking catalyst was used.

The scope of this invention is to be determined by the appended claims. It is not intended that the scope of the invention be limited to the specific examples presented above by way of illustration.

What is claimed is:

1. A process for the production of a synthetic hydrocarbon lubricating oil which comprises the catalytic cracking of a copolymer of ethylene and an alpha olefin of from 3 to 10 carbon atoms, of 5,000 to 900,000 viscosity average molecular weight under conditions reducing the viscosity of said polymer to a viscosity within the range of about 30 to 70 SUS measured at 210° F., said cracking being conducted in the presence of a catalyst comprising a rare-earth-promoted crystalline alumino-silicate zeolite in a silica-alumina matrix.

2. Process as defined by claim 1 wherein said copolymer contains from 20 to 95 mole percent of ethylene.

3. Process as defined by claim 1 wherein said copolymer is a copolymer of ethylene and propylene.

4. Process as defined by claim 1 wherein said copolymer is a terpolymer of ethylene, propylene, and a non-conjugated diolefin of from 6 to 18 carbon atoms.

5. Process as defined by claim 1 wherein said copolymer has a viscosity average molecular weight within the range of about 100,000 and 500,000.

6. Process as defined by claim 1 wherein said catalytic cracking is conducted at a temperature within the range of about 600° to 1100° F.

7. Process as defined by claim 1 which includes the subsequent step of hydrogenating the product of the catalytic cracking step.

References Cited

UNITED STATES PATENTS

| | | | |
|---|---|---|---|
| 3,582,279 | 6/1971 | Beckman et al. | 260—683 R |
| 3,676,521 | 7/1972 | Stearns et al. | 260—683.1 |
| 3,499,741 | 3/1970 | Sweeney | 44—62 |
| 3,704,108 | 11/1972 | Alpert | 44—62 |

HERBERT LEVINE, Primary Examiner

U.S. Cl. X.R.

252—59; 260—683